(12) United States Patent
Slesinski et al.

(10) Patent No.: US 7,015,459 B2
(45) Date of Patent: Mar. 21, 2006

(54) METHOD AND APPARATUS FOR LOCATING LASER PROJECTION ALIGNMENT TARGETS

(75) Inventors: Raymond J. Slesinski, Arnold, MO (US); Richard J. Steckel, Washington, MO (US); Jeffery J. Luner, Collinsville, IL (US)

(73) Assignee: The Boeing Company, Chicago, IL (US)

( * ) Notice: Subject to any disclaimer, the term of this patent is extended or adjusted under 35 U.S.C. 154(b) by 190 days.

(21) Appl. No.: 10/698,611

(22) Filed: Oct. 31, 2003

(65) Prior Publication Data

US 2005/0092908 A1 May 5, 2005

(51) Int. Cl.
*G01C 15/02* (2006.01)
(52) U.S. Cl. ..................................................... 250/239
(58) Field of Classification Search ............. 250/206.1, 250/206.2, 239; 356/375, 3.11; 33/258, 33/293
See application file for complete search history.

(56) References Cited

U.S. PATENT DOCUMENTS 5,073,005 A    12/1991  Hubbs
5,801,834 A *  9/1998   Danielson .................... 356/620

FOREIGN PATENT DOCUMENTS

FR          2 723 213        2/1996
WO       WO 02/097362 A     12/2002
WO   PCT/US2004/036145      10/2004

* cited by examiner

*Primary Examiner*—Thanh X. Luu
*Assistant Examiner*—Tony Ko
(74) *Attorney, Agent, or Firm*—Thompson Coburn LLP

(57) ABSTRACT

A method is disclosed for aligning a laser projection device with a subject article. The method comprises the utilization of specially adapted mounts to secure reflective targets to specific geometric features of such a subject article. By mounting the laser target devices to the subject article itself, tooling jigs are not necessary and the targets can be easily positioned at various locations to avoid laser beam obstruction concerns and to ensure accurate alignment.

20 Claims, 4 Drawing Sheets

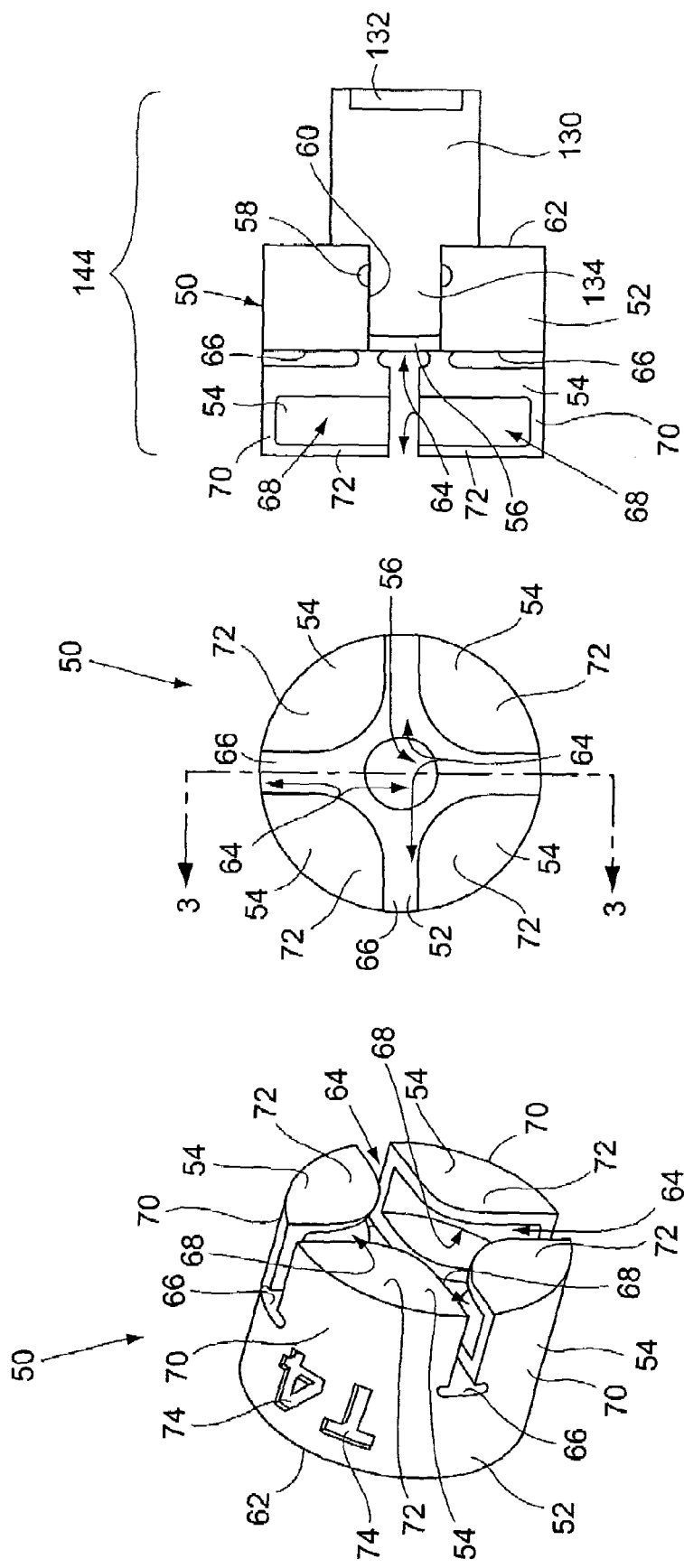

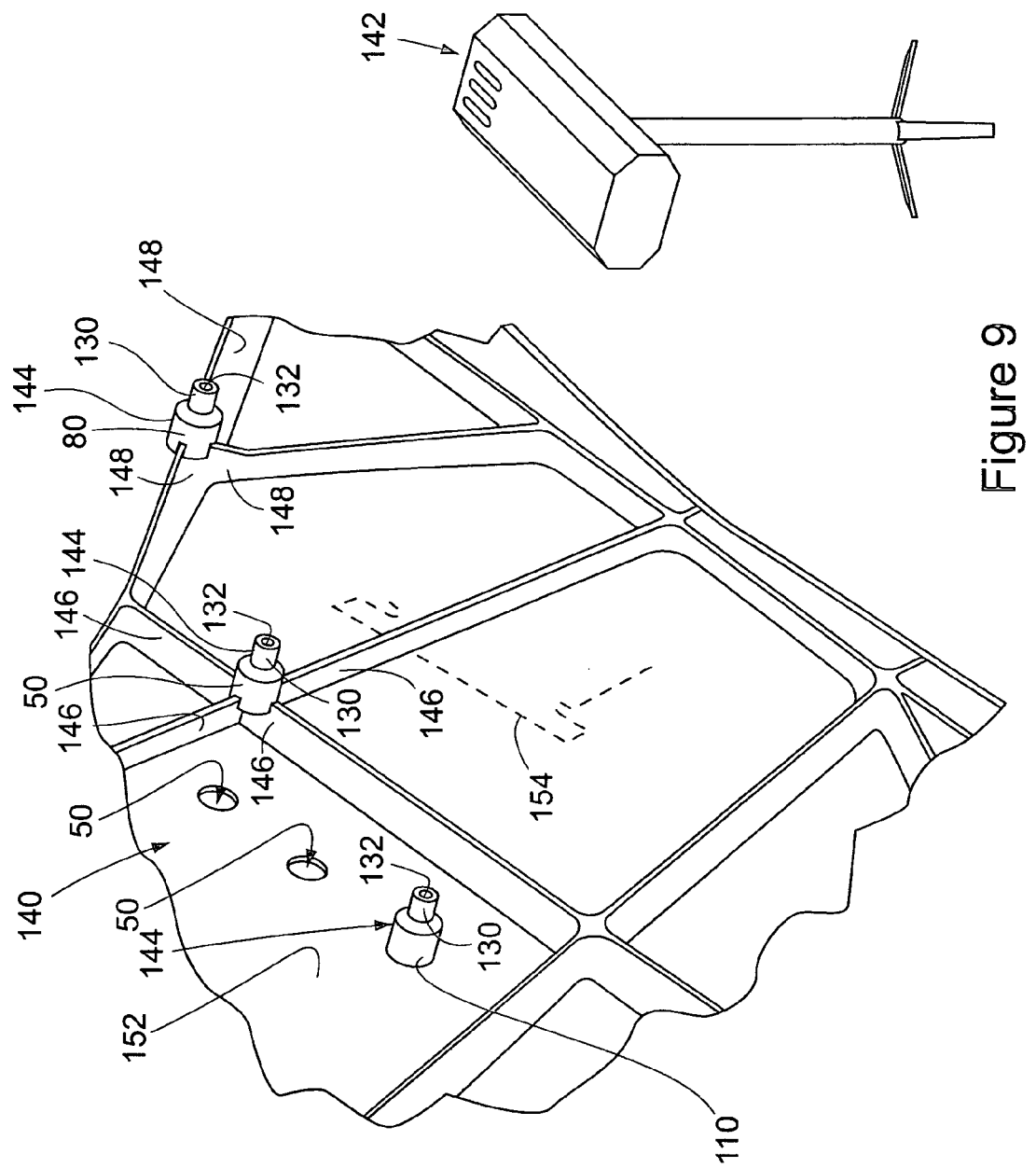

METHOD AND APPARATUS FOR LOCATING LASER PROJECTION ALIGNMENT TARGETS

BACKGROUND OF THE INVENTION

This invention pertains to the field of laser projection technology. More particularly, this invention pertains to laser target devices used to align laser projection devices with subject articles.

Laser projection technology provides means for accurately projecting illuminated lines and curves onto surfaces of subject articles using laser projection devices. The projection of lines and curves onto subject articles is useful for, among other things, locating where component parts are to be assembled to such subject articles without requiring scales or hard tooling and for validating the configuration of such subject articles as compared to their nominal design dimensions.

The procedure for using laser projection technology typically comprises the providing of a laser projection device and of a subject article onto which it is sought to display a laser projection. Prior to projecting a laser beam onto the subject article, the orientation of the laser projection device relative to the subject article is often determined by aligning the laser projection device with whatever tooling supports the subject article. Such alignment often involves aiming the laser beam emitted by the laser projection device at several (usually six) reflective targets that are attached to the tooling. The relative positional coordinates of each of these six reflective targets is imputed into the software that controls the laser projection device. Thus, by initially manually aligning the laser beam with four of the six reflective targets, and then using the software to automatically align the laser beam with the remaining two reflective targets, the orientation and position of the subject article relative to the laser projection device can be determined via the laser projection device's software.

With the alignment between the subject article and the laser projection device determined, the laser projection device can then be utilized to project illuminated lines and curves onto the surface of the subject article. Typically, the software of the laser projection device utilizes a computer aided design (CAD) model of the subject article and makes calculations based thereon to direct the laser beam of the laser projection device in the desired pattern.

The above-mentioned steps of aligning a laser projection device with a subject article is often facilitated by utilizing laser target devices that each comprise a reflective target mounted on a stem. The stem of such a laser target device is typically formed in a manner such that the stem comprises a necked-down shank that is dimensioned similar to the shank provided on a common construction ball device of the type often utilized in connection with typical tooling assembly jigs. Holes formed into the tooling jig assemblies are dimensioned to tightly hold such shanks and thereby allow the laser target devices and construction ball devices to be attached to tooling jig assemblies by simply inserting the shanks thereinto. Thus, during alignment, it is common practice to remove the construction ball devices from the tooling jig assemblies and to install laser target devices in their place. In so doing, the positional coordinates of the reflective targets relative to the subject article are identical to those of the construction balls. Thus, the coordinates of the construction balls with respect to the subject article, which presumably are already known, can be utilized by the software of the laser projection device for alignment purposes. Alternatively, if the subject article is not supported by tooling, the laser target devices can be positioned at various locations adjacent the subject article. However, using this approach often requires some form of accurate, and typically expensive, three-dimensional measuring system to determine the relative coordinates of the various laser target devices with respect to the subject article.

Although the above-mentioned methods of aligning laser projection devices with subject articles achieve desired results, they are not without disadvantages. For example, a minimum of six laser target devices is often needed to properly align most laser projection devices and, in cases where the subject article is supported by tooling, there may be an insufficient number of construction ball device holes on the tooling for the required number of targets. Moreover, the laser projection device must be able to reflect its laser beam directly to the reflective target of each laser target device and thus attention must be paid to the placement of the targets so as to avoid obscuring the line-of-sight to such targets by the tooling or by the subject article itself. If, on the other hand, no tooling is utilized, as previously mentioned, the positional coordinates of the selected laser target locations must first be determined using some other three-dimensional measuring system. Yet further, regardless of which of these methods is utilized, if the subject article is bumped or otherwise moved relative to the laser target devices, the laser beam projection will be inaccurately projected.

SUMMARY OF THE INVENTION

The present invention overcomes many disadvantages associated with prior art methods of aligning laser projection devices with subject articles by providing and utilizing specially adapted mounts that secure reflective targets to specific geometric features of such subject articles. The mounts can be formed to attach to various features of any subject article including, but not limited to, features having known locations relative to the subject article such as holes, slots, ribs, flanges, and web intersections. By mounting the laser target devices to the subject article itself, tooling jigs are not necessary and the targets can be easily positioned at various locations to avoid laser beam obstruction concerns and to ensure accurate alignment.

In a first aspect of the invention, an assembly comprises a subject article and a laser target device. The laser target device comprises a reflective target and a mount. The mount has first and second portions and is formed such that the first portion of the mount is resiliently deflectable from a neutral position relative to the second portion of the mount. The mount secures the reflective target to the subject article at least partially by the first and second portions of the mount being biased into engagement with the subject article via a biasing force that exists as a result of the first portion being deflected from the neutral position relative to the second portion.

In a second aspect of the invention, a method comprises the steps of providing a subject article and forming a mount. The forming of the mount occurs in a manner such that the mount comprises first and second portions and such that the first portion of the mount is resiliently deflectable from a neutral position relative to the second portion of the mount. Additionally, the method comprises rigidly connecting a reflective target to the mount in a manner forming a laser target device that is comprised of the reflective target and the mount. Furthermore, the method also comprises attaching the laser target device to the subject article by at least resiliently deflecting the first portion of the mount from the neutral position relative to the second portion and engaging the first and second portions of the mount with the subject article. As such, a biasing force that is created as a result of the first portion being deflected from the neutral position relative to the second portion acts to force the first and second portions of the mount into engagement with the subject article. Yet further, the method comprises aligning a laser projection device with the subject article by reflecting a laser beam emitted from the laser projection device off of the reflective target of the laser target device with the laser target device attached to the subject article as recited.

In a third aspect of the invention, a method comprises the steps of providing a subject article that has a surface geometry and creating a digital representation of at least a portion of such surface geometry. Additionally, the method also comprises forming a mount via a digitally controlled layered manufacturing technique. The forming of the mount is dependent upon the digital representation of the portion of the surface geometry. The method further comprises the steps of rigidly connecting a reflective target to the mount in a manner forming a laser target device that is comprised of the reflective target and the mount, and attaching the laser target device to the subject article by at least engaging the mount of the laser target device with the surface geometry of the subject article. Yet further, the method comprises aligning a laser projection device with the subject article by reflecting a laser beam emitted from the laser projection device off of the reflective target of the laser target device with the laser target device attached to the subject article as recited.

While the principal aspects and features of the invention have been described above, other aspects and features and a more complete and thorough understanding of the invention may be obtained by referring to the drawings and the detailed description of the preferred embodiments, which follow.

BRIEF DESCRIPTION OF THE DRAWINGS

FIG. 1 is a perspective view of a first mount in accordance with the invention.

FIG. 2 is a plan view of the first mount shown in FIG. 1.

FIG. 3 is a cross-section view of the first mount shown in FIGS. 1 and 2 with a stem and reflective target attached thereto, and is taken about the line 3—3 in FIG. 2.

FIG. 9 is a perspective view of a subject article shown with the first, second, and third mounts attached thereto and with a laser projection device projecting an image onto the subject article.

Figure 6:
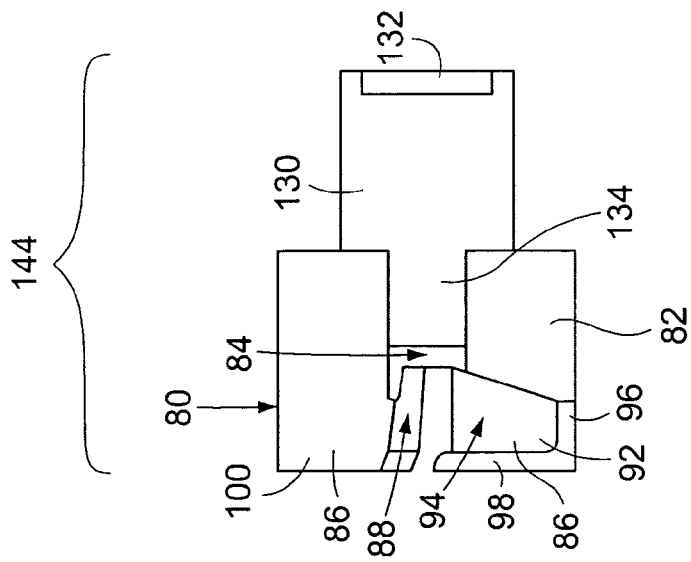
FIG. 6 is a cross-section view of the second mount shown in FIGS. 4 and 5 with a stem and reflective target attached thereto, and is taken about the line 6—6 in FIG. 5.

Reference characters in the written specification indicate corresponding items shown throughout the drawing figures.

DETAILED DESCRIPTION OF PREFERRED EMBODIMENTS OF THE INVENTION

In accordance with the invention, specially adapted mounts are formed for operatively connecting reflective targets to various subject articles. A first mount 50 in accordance with the invention is shown in FIGS. 1–3 and preferably comprises a generally cylindrical base portion 52 and a plurality of protrusions 54 that extend axially from one side of the base portion. The first mount 50 is preferably formed as a single monolithic part from a polymeric material such as nylon 11, although other materials such as wood, metal, and rubber could also be used. Additionally, the first mount 50 is preferably formed using a layered manufacturing technique such as selective laser sintering (SLS), fused deposition modeling (FDM), or stereo lithography (STL), but other traditional machining and molding techniques could also be utilized to form the mount. Preferably, the layered manufacturing technique is utilized in connection with a CAD model of a particular subject article to quickly form a mount that has geometry that cooperates with a particular feature of the subject article. This first mount 50 is specifically adapted for being secured to two intersecting web portions of the subject article that are formed by flanges or stiffeners.

The base portion 52 of the first mount 50 preferably comprises a generally cylindrical opening 56 that extends axially therethrough. An annular channel 58 is preferably formed into the main surface 60 of the opening 56 adjacent the axial end surface 62 of the base portion 52. The protrusions 54 of the first mount 50 preferably form two intersecting slots 64 that extend through the first mount in directions perpendicular to the cylindrical axis of the base portion 52. The base 66 of each slot 64 is preferably made wider than the rest of the slot to eliminate the presence of any radius between the protrusions 54 and the base portion 52 that could potentially prevent the corresponding web portion of the subject article from fully seating against the base of the slot when inserted thereinto. A cavity 68 is formed into each protrusion 54 that extends radially outward from the cylindrical axis of the base portion 52. As a result, each protrusion 54 has an arcuate wall portion 70 and terminates with an overhang 72 that extends radially inward from the arcuate wall in a cantilevered manner. Finally, using the layered manufacturing technique to form the first mount 50, recessed or raised indicia 74 can be formed directly into the surface of the mount during its manufacture. Such indicia 74 is useful for subsequently distinguishing the particular mount from other similar, but different, mounts during their use.

Figure 5:
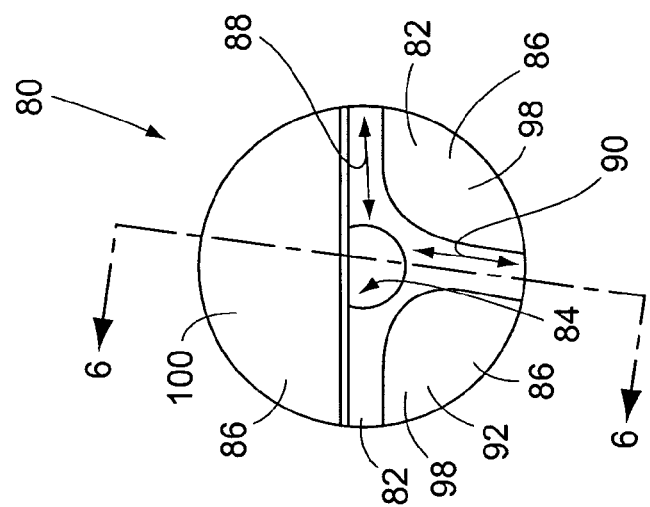
FIG. 5 is a plan view of the second mount shown in FIG. 4.
Figure 4:
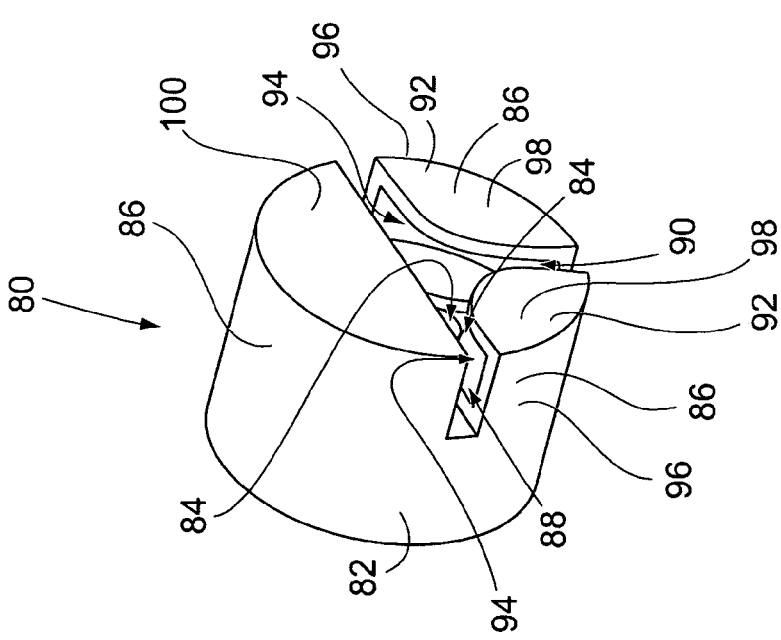
FIG. 4 is a perspective view of a second mount in accordance with the invention.

A second mount 80 in accordance with the invention is shown in FIGS. 4–6. The second mount 80 is preferably formed using the same techniques as are used to form the first mount 50 and is preferably formed of the same material. The second mount 80 is specifically adapted for being secured to two intersecting web portions of a subject article, wherein one of the web portions terminates at the intersection with the other web portion and wherein the web portions do not share a common planer surface and do not intersect perpendicularly to each other.

The second mount 80 has a base portion 82 and opening 84 similar to the base portion 52 of the first mount 50 and also comprises a plurality of protrusions 86 extending axially from its base portion. The protrusions 86 are positioned in manner forming two intersecting slots 88, 90. A first one of the slots 88 extends through the second mount 80 in a direction perpendicular to the cylindrical axis of the base portion 82. The other second slot 90 extends radially into the second mount 80 until terminating at its intersection with the first slot 88. As the second slot 90 extends radially outward from the first slot 88, it becomes axially less deep. The two protrusions 92 on opposite sides of the second slot 90 have cavities 94 formed therein in a manner similar to the protrusions 54 of the first mount 50. Thus, like the protrusions 54 of the first mount 50, each of these two protrusions 92 comprises an arcuate wall portion 96 and an overhang 98. The remaining protrusion 100 that is positioned on the opposite side of the first slot 88 preferably has no such cavity.

Figures 7, 8:
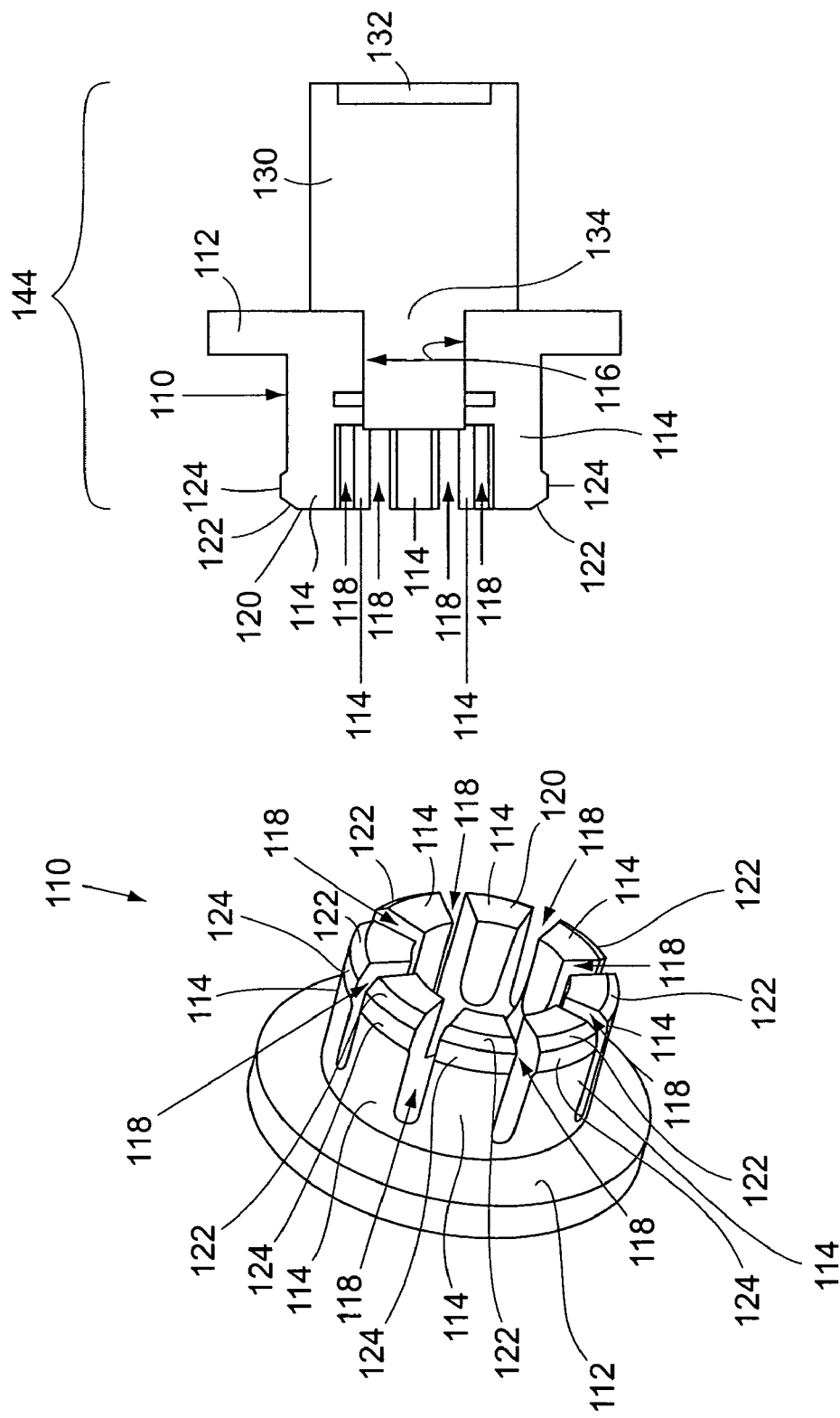
FIG. 7 is a perspective view of a third mount in accordance with the invention.
FIG. 8 is a cross-section view of the third mount shown in FIG. 7 with a stem and reflective target attached thereto and is taken about a plane of symmetry of the third mount.

Yet another mount in accordance with the invention is shown in FIGS. 7 and 8. This third mount 110, like the second mount 80, is preferably formed of the same material as the first mount 50 via the same fabrication techniques. However, the third mount 110 is particularly adapted to attach a reflective target to a cylindrical hole formed in a subject article. As such, the third mount 110 is preferably symmetrical about an axis.

Like the other mounts discussed above, the third mount 110 preferably comprises a generally cylindrical base portion 112 and a plurality of protrusions 114 that extend axially therefrom. Preferably, a cylindrical opening 116 extends through the mount 100 along the axis of symmetry. The protrusions 114 are preferably positioned circumferentially about the axis of symmetry in an evenly spaced manner and are separated by an equal number of slots 118. The terminal end 120 of each protrusion 114 preferably has a chamfer 122 or round on its radially outer most portion. Each protrusion 114 also preferably comprises a lip 124 adjacent the chamfer 122 that has a diameter slightly larger than the main diameter of the protrusions.

The preferred method of aligning a laser projection device with a subject article in accordance with the invention comprises the formation of mounts such as those discussed above. The next step involves the use of the mounts to connect reflective targets to a subject article. This latter step comprises the attachment of a standard stem mounted reflective target to each mount so as to form a laser target device. Such stem mounted reflective targets are preferably identical to those in use with prior art methods and typically comprise a stem portion and a reflective target. The reflective target is preferably formed of a retro-reflective material and is preferably discoidal in shape.

As shown in FIGS. 3, 6, and 8, the stem portion 130 of a stem mounted reflective target is primarily a cylindrical shaft formed of metal. The reflective target 132 is attached, preferably via an adhesive, to one of the longitudinal ends of the stem portion 130 and is oriented at a specific angle such as 0°, 22.5°, 45°, 67.5°, or 90° with respect to the longitudinal axis of the stem portion (0° is shown). Each stem portion 130 is also provided with a necked-down shank 134 at its opposite longitudinal end and preferably is attached to a mount 50,80,110 by inserting its shank into the opening 56,84,116 of the respective mount, from the side opposite the protrusions, until the remainder of stem portion engages against the base portion 52,82,112 of the mount. Although the shank 134 of the stem portion 130 is typically approximately 0.250 inches in diameter, the opening 56,84,116 in each mount is preferably formed with a diameter of approximately 0.247 inches. Thus, there is a slight interference fit between each shank 134 and the opening 56,84,116 of the mount to which it is attached that secures the shank in the opening by creating a press-fit connection. As described in the description of the first mount 50, the annular channel 58 that is recessed in the opening of the mount facilitates the attachment of a stem mounted reflective target to the mount by increasing the flexibility of the material immediately adjacent the opening 56 at the axial end surface 62 of the base portion 52. This facilitates the initial insertion of the shank 134 of the stem mounted reflective target into the opening 56. Additionally, if desired, a resilient O-ring (not shown) can be inserted in the annular channel 58 where it will compress against the shank 134 of the stem portion 130 to further frictionally secure the stem mounted reflective target to the mount 50.

Each assembly of a stem mounted reflective target with a mount constitutes a laser target device. In the preferred method of aligning a laser projection device with a subject article, these laser target devices are preferably attached directly to the subject article with which a laser projection device is to be aligned. FIG. 9 depicts a set up of a subject article 140, a laser projection device 142, and several laser target devices 144 for use in connection with the preferred method of practicing the invention.

Prior to the alignment of the laser projection device 142, the laser target devices 144 are attached directly to the subject article 140. Preferably, at least six laser target devices 144 are attached to the subject article. However, for purposes of describing the various aspects of the invention, only three such laser target devices 144 are shown and each is shown with a different style of mount. Nonetheless, it should be appreciated that other styles of mounts could be utilized and that the mounts could, in some cases, be all identical to each other.

One of the laser target devices 144 shown in FIG. 9 comprises the first mount 50 shown in FIGS. 1–3. This laser target device 144 is attached to the subject article by engaging the first mount 50 with two intersecting web portions 146 of the subject article. This is done by pressing the first mount 50 against the intersecting web portions 146, with one of the web portions aligned with one of slots 64 of the first mount and the other of the web portions aligned with the other of the slots. As the first mount 50 is pressed against the web portions 146, the web portions move into the slots 64 until they engage against the bases 66 of the slots 64. Each of the slots 64 of the first mount 50 is preferably dimensioned such that it is slightly narrower than the width of respective web portion 146 to which it is engaged. However, each of the protrusions 54 of the first mount 50 is resiliently deflectable relative to the other protrusions, especially in view of the cavities 68 formed thereinto. Thus, during the attachment of the first mount 50 to the web portions 146, the protrusions 54 of the first mount deflect relative to each other to allow the insertion of the web portions into the slots 64. As such, the resiliency of the protrusions 54 creates a force that acts to return the protrusions to their original undeflected relative positions and thereby biases the protrusions into engagement with the web portions 164. This biasing force frictionally secures the first mount 50 to the web portions 146 of the subject article 140 and thereby secures the laser target device 144 to the subject article.

A second one of laser target devices 144 shown in FIG. 9 comprises the second mount 80 shown in FIGS. 4–6. Similar to the previously described laser target device 144, this laser target device is attached to the subject article by engaging the second mount 80 with two intersecting web portions 148 of the subject article. However, one of the web portions 148 to which the second mount 80 is attached terminates at its intersection with the other of the web portions. Moreover, the web portions 148 to which that second mount is attached do not extend perpendicularly to each other and do not share any planar surface. This being said, the second mount 80 is attached to the web portions 148 in a manner essentially identically to the manner in which the first mount is attached to the web portions described above. Thus, a biasing force frictionally secures the second mount 80 to the web portions 148 of the subject article 140 and thereby secures the laser target device 144 to the subject article.

The third one of laser target devices 144 shown in FIG. 9 comprises the third mount 110 shown in FIGS. 7 and 8. Unlike the previously described target projection devices 144, this laser target device is attached to the subject article by engaging the third mount 110 with an inward facing cylindrical surface of the subject article that is formed by a hole in the subject article such as those holes 150 shown adjacent the third mount in FIG. 9. This is done by inserting the protrusions 114 of the third mount 110 into the hole. The alignment of the third mount 110 with the hole is facilitated during the initial insertion of the protrusions 114 thereinto by the chamfers 122 formed on the protrusions. However, the diameter of the lips 124 of the protrusions 114 are preferably dimensioned slightly larger than the hole into which the protrusions are inserted. This causes the protrusions 114 to resiliently deflect toward one another during there insertion into the hole. Once the base portion 112 of the third mount 80 engages against the surface 152 of the subject article 140 through which the hole is formed, the third mount 80 is released. When released, the third mount 110 is held in place by the resiliency of the protrusions 114 that creates a force that acts to return the protrusions to their original undeflected relative positions and thereby biases the protrusions into engagement with an inward facing surface of the hole. With the third mount 110 secured to the subject article 140, the laser target device 144 is thereby also secured to the subject article.

As mentioned above, preferably six laser target devices are attached to the subject article, preferably each by using the present invention. With six laser target devices 144 attached to the subject article 140, the laser projection device 142 is preferably then aligned with the subject article. The laser projection device 142 utilized in connection with the preferred embodiment is preferably a model LPT1 produced by Laser Projection Technologies out of Londonderry, N.H. A digital representation of at least a portion of the subject article 140 is made retrievable by the control software of the laser projection device 142, as is the theoretical relative coordinate positions of the center points of each of the reflective targets 123 with respect to the portion of the subject article. The alignment involves manually and sequentially aiming the laser beam of the laser projection device 142 at each of four of the reflective targets 132 of the laser target devices 144. Using the data made retrievable by the control software of the laser projection device 142, the laser projection device is then able to automatically align its laser beam with two additional reflective targets and thereby determine its relative position with respect to the subject article 140.

With the laser projection device aligned with the subject article 140 as discussed above, the laser projection device 142 is then utilized to project a laser illuminated image 154 onto the surface of the subject article. This occurs in a manner similar to any method of laser projection.

While the present invention has been described in reference to specific embodiments, in light of the foregoing, it should be understood that all matter contained in the above description or shown in the accompanying drawings is intended to be interpreted as illustrative and not in a limiting sense and that various modifications and variations of the invention may be constructed without departing from the scope of the invention defined by the following claims. For example, various features of subject articles other than those described herein could also be utilized as geometry for attachment of laser target device mounts. Additionally, reflective targets could be attached directly to a customized mount, thereby eliminating the need for any separate stem portion. Thus, other possible variations and modifications should be appreciated.

Furthermore, it should be understood that when introducing elements of the present invention in the claims or in the above description of the preferred embodiment of the invention, the terms "comprising," "including," and "having" are intended to be open-ended and mean that there may be additional elements other than the listed elements. Similarly, the term "portion" should be construed as meaning some or all of the item or element that it qualifies.

What is claimed is:

1. An assembly comprising:
a subject article; and
a laser target device, the laser target device comprising a reflective target and a mount, the mount having first and second portions, the first portion of the mount being resiliently deflectable from a neutral position relative to the second portion of the mount, the mount rigidly securing the reflective target to the subject article at least partially by the first and second portions of the mount being biased into engagement with the subject article via a biasing force that exists as a result of the first portion being deflected from the neutral position relative to the second portion.

2. An assembly in accordance with claim 1 wherein the first portion of the mount comprises a first surface and the second portion of the mount comprises a second surface, the first and second surfaces facing toward one another, the first and second surfaces being engaged with the subject article, the biasing force acting to force the first and second surfaces against a portion of the subject article that is positioned between the first and second surfaces of the mount.

3. An assembly in accordance with claim 2 wherein the portion of the subject article comprises first and second wall portions that each comprise opposite side surfaces, the first wall portion being intersected at an angle by the second wall portion, the mount engaging the opposite side surfaces of the first wall portion and engaging at least one of the opposite side surfaces of the second wall portion.

4. An assembly in accordance with claim 1, wherein the first portion of the mount comprises a first surface and the second portion of the mount comprises a second surface, the first and second surfaces facing away from one another, the first and second surfaces being engaged with the subject article, the biasing force acting to force the first and second surfaces away from each other and against opposing surface portions of the subject article.

5. An assembly in accordance with claim 4, wherein the mount comprises a plurality of tabs arranged in a circumferential manner, one of the plurality of tabs constituting the first portion of the mount and another of the tabs constituting the second portion of the mount, the opposing surface portions of the subject article each being part of an inward facing cylindrical surface of the subject article.

6. An assembly in accordance with claim 1 wherein the laser target device further comprises a stem, the stem connecting the reflective target to the mount, the mount having a recessed opening that extends into the mount, the stem having a portion that is press-fit into the recessed opening of the mount in a manner securing the mount to the stem.

7. A method comprising:
   providing a subject article;
   forming a mount in a manner such that the mount comprises first and second portions and such that the first portion of the mount is resiliently deflectable from a neutral position relative to the second portion of the mount;
   rigidly connecting a reflective target to the mount in a manner forming a laser target device that is comprised of the reflective target and the mount;
   rigidly attaching the reflective target of the laser target device to the subject article by at least resiliently deflecting the first portion of the mount from the neutral position relative to the second portion and engaging the first and second portions of the mount with the subject article so that a biasing force that is created as a result of the first portion being deflected from the neutral position relative to the second portion acts to force the first and second portions of the mount into engagement with the subject article; and
   aligning a laser projection device with the subject article by reflecting a laser beam emitted from the laser projection device off of the reflective target of the laser target device with the laser target device attached to the subject article as recited.

8. A method in accordance with claim 7 wherein the step of attaching the laser target device to the subject article occurs by at least resiliently deflecting the first portion of the mount away from the second portion, and wherein the biasing force that acts to force the first and second portions of the mount into engagement with the subject article does so by acting to force the first portion of the mount toward the second portion of the mount.

9. A method in accordance with claim 8 wherein the step of providing the subject article occurs in a manner such that the subject article comprises first and second wall portions that each comprise opposite side surfaces, the first wall portion being intersected at an angle by the second wall portion, and wherein the step of attaching the mount to the subject article occurs by engaging the mount with both of the opposite side surfaces of the first wall portion and with at least one of the opposite side surfaces of the second wall portion.

10. A method in accordance with claim 7 wherein the step of attaching the laser target device to the subject article occurs by at least resiliently deflecting the first portion of the mount toward the second portion, and wherein the biasing force that acts to force the first and second portions of the mount into engagement with the subject article does so by acting to force the first portion of the mount away from the second portion of the mount.

11. A method in accordance with claim 10 wherein the step of providing the subject article occurs in a manner such that the subject article comprises an inward facing cylindrical surface, and wherein the step of providing the mount occurs in a manner such that the mount comprises a plurality of tabs arranged in a circumferential manner, one of the plurality of tabs constituting the first portion of the mount and another of the tabs constituting the second portion of the mount, and further wherein the step of attaching the mount to the subject article occurs by engaging at least two of the plurality of tabs of the mount with the inward facing cylindrical surface of the subject article in manner that deflects the at least two of tabs toward each other.

12. A method in accordance with claim 7 wherein the step of rigidly connecting the reflective target to the mount comprises attaching the reflective target to a stem of the laser target device and attaching the stem to the mount via a press-fit connection.

13. A method comprising:
    providing a subject article;
    creating a digital representation of at least a portion of the subject article;
    forming a mount in a manner such that the mount comprises first and second portions and such that the first portion of the mount is resiliently deflectable from a neutral position relative to the second portion of the mount, the forming occurring via a digitally controlled layered manufacturing technique that is dependent upon the digital representation of the portion of the subject article;
    rigidly connecting a reflective target to the mount in a manner forming a laser target device that is comprised of the reflective target and the mount;
    attaching the laser target device to the subject article by at least resiliently deflecting the first portion of the mount from the neutral position relative to the second portion and engaging the first and second portions of the mount with the subject article so that a biasing force that is created as a result of the first portion being deflected from the neutral position relative to the second portion acts to force the first and second portions of the mount into engagement with the subject article; and
    aligning a laser projection device with the subject article by reflecting a laser beam emitted from the laser projection device off of the reflective target of the laser target device with the laser target device attached to the subject article as recited.

14. A method comprising:
    providing a subject article, the subject article having a surface geometry;
    creating a digital representation of at least a portion of the surface geometry of the subject article;
    forming a mount via a digitally controlled layered manufacturing technique, the forming of the mount being dependent upon the digital representation of the portion of the surface geometry;
    rigidly connecting a reflective target to the mount in a manner forming a laser target device that is comprised of the reflective target and the mount;
    attaching the laser target device to the subject article by at least engaging the mount of the laser target device with the surface geometry of the subject article; and
    aligning a laser projection device with the subject article by reflecting a laser beam emitted from the laser projection device off of the reflective target of the laser target device with the laser target device attached to the subject article as recited.

15. A method in accordance with claim 14 wherein the step of forming the mount occurs in a manner such that the mount comprises first and second portions and such that the first portion of the mount is resiliently deflectable from a neutral position relative to the second portion of the mount, and wherein the step of attaching the laser target device to the subject article occurs by at least resiliently deflecting the first portion of the mount away from the second portion in a manner creating a biasing force that acts to force the first and second portions of the mount into engagement with the surface geometry of the subject article by forcing the first portion of the mount toward the second portion of the mount.

16. A method in accordance with claim 15 wherein the step of providing the subject article occurs in a manner such that the portion of the surface geometry of the subject article comprises first and second wall portions that each comprise opposite side surfaces, the first wall portion being intersected at an angle by the second wall portion, and wherein the step of attaching the mount to the surface geometry of the subject article occurs by engaging the mount with both of the opposite side surfaces of the first wall portion and with at least one of the opposite side surfaces of the second wall portion.

17. A method in accordance with claim 14 wherein the step of forming the mount occurs in a manner such that the mount comprises first and second portions and such that the first portion of the mount is resiliently deflectable from a neutral position relative to the second portion of the mount, and wherein the step of attaching the laser target device to the subject article occurs by at least resiliently deflecting the first portion of the mount toward the second portion in a manner creating a biasing force that acts to force the first and second portions of the mount into engagement with the surface geometry of the subject article by forcing the first portion of the mount away from the second portion of the mount.

18. A method in accordance with claim 17 wherein the step of providing the subject article occurs in a manner such that the portion of the surface geometry of the subject article comprises an inward facing cylindrical surface, and wherein the step of providing the mount occurs in a manner such that the mount comprises a plurality of tabs arranged in a circumferential manner, one of the plurality of tabs constituting the first portion of the mount and another of the tabs constituting the second portion of the mount, and further wherein the step of attaching the mount to the surface geometry of the subject article occurs by engaging the at least two of the plurality of tabs of the mount with the inward facing cylindrical surface of the subject article in a manner that deflects the at least two of the plurality of tabs toward each other.

19. A method in accordance with claim 14 wherein the step of rigidly connecting the reflective target to the mount comprises attaching the reflective target to a stem of the laser target device and attaching the stem to the mount via a press-fit connection.

20. A method in accordance with claim 14 wherein the step of forming the mount portion comprises creating a three-dimensional label on the mount via the digitally controlled layered manufacturing technique, the label comprising indicia that is viewable on the laser target device and that serves to distinguish the laser target device from other laser target devices.

* * * * *